United States Patent
Tiberghien et al.

(10) Patent No.: US 11,339,812 B2
(45) Date of Patent: May 24, 2022

(54) MULTI-COUPLINGS PLATE AND ENSEMBLE OF PLATES COMPRISING SUCH A MULTI-COUPLINGS PLATE

(71) Applicant: STAUBLI FAVERGES, Faverges-Seythenex (FR)

(72) Inventors: Alain-Christophe Tiberghien, Sevrier (FR); Philippe Guin, Annecy (FR); Anthonin Gobber, Faverges-Seythenex (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 857 days.

(21) Appl. No.: 16/194,858

(22) Filed: Nov. 19, 2018

(65) Prior Publication Data
US 2019/0154065 A1    May 23, 2019

(30) Foreign Application Priority Data
Nov. 23, 2017    (FR) ...................................... 1761097

(51) Int. Cl.
*H01R 13/629*    (2006.01)
*F16B 1/02*    (2006.01)
(Continued)

(52) U.S. Cl.
CPC ................ *F16B 1/02* (2013.01); *F16L 37/12* (2013.01); *F16L 37/36* (2013.01); *F16L 37/56* (2013.01);
(Continued)

(58) Field of Classification Search
CPC ........................... H01R 9/0518; H01R 13/506; H01R 13/6272; H01R 13/62944
See application file for complete search history.

(56) References Cited

U.S. PATENT DOCUMENTS 3,214,195 A * 10/1965 Zahuranece ............ F16L 37/56
285/27
2016/0149342 A1* 5/2016 Rodriguez ........... H01R 13/514
439/157
(Continued)

FOREIGN PATENT DOCUMENTS

EP    0037351 A1    10/1981
EP    0621430 A2    10/1994
(Continued)

OTHER PUBLICATIONS

International Search Report for FR1761097, dated Jun. 26, 2018.

*Primary Examiner* — Tho D Ta

(57) ABSTRACT

This multi-couplings plate (P1) includes a locking device comprising a frame (14) fixed on the plate (P1), locking members and a drive mechanism, comprising a rotary element (18) rotatable in the frame (14), a sliding element translatable relative to the frame (14) and which cooperates with the locking members. The locking device also comprises several ratchet notches (301-309) secured to an element (18) of the drive mechanism (16) and juxtaposed in the movement direction relative to the frame (14) of the element (18) of the drive mechanism, the ratchet notches (301-309) comprising a final notch (309) and at least one intermediate notch (303-308), and a pawl movable in a housing (326) of the frame (14) and pushed back by a spring (28) toward one of the ratchet notches (301-309). When the pawl cooperates with the intermediate notch (303-308), the pawl limits the movement of the sliding element toward its forward position to a position midway between the forward position and the withdrawn position, and in the coupled configuration, the pawl cooperates with the final notch (309) and keeps the sliding element in the withdrawn position.

15 Claims, 10 Drawing Sheets

(51) Int. Cl.
*F16L 37/56* (2006.01)
*H01R 13/639* (2006.01)
*H01R 25/00* (2006.01)
*F16L 37/12* (2006.01)
*F16L 37/36* (2006.01)
*E02F 3/36* (2006.01)
*F16L 25/01* (2006.01)

(52) U.S. Cl.
CPC ..... *H01R 13/62944* (2013.01); *H01R 13/639* (2013.01); *H01R 25/006* (2013.01); *E02F 3/3609* (2013.01); *F16L 25/01* (2013.01); *F16L 2201/10* (2013.01); *F16L 2201/20* (2013.01)

(56) References Cited

U.S. PATENT DOCUMENTS

| | | | |
|---|---|---|---|
| 2017/0261139 A1* | 9/2017 | Tiberghien | F16L 37/23 |
| 2017/0279215 A1* | 9/2017 | Shibaya | H01R 13/639 |
| 2017/0352982 A1* | 12/2017 | Mito | H01R 13/62977 |

FOREIGN PATENT DOCUMENTS

| | | |
|---|---|---|
| JP | 7208679 | 1/1994 |
| WO | 2013/074047 A2 | 5/2013 |

* cited by examiner

MULTI-COUPLINGS PLATE AND ENSEMBLE OF PLATES COMPRISING SUCH A MULTI-COUPLINGS PLATE

The invention relates to a multi-couplings plate for the simultaneous connection of several fluid and/or electrical couplings. The invention also relates to an ensemble of plates comprising such a multi-couplings plate.

It is known to bring together and lock two multi-couplings plates using a locking device supported by one of the two plates and comprising a rotary element as well as a translatable lock shaft, a device for converting the rotating movement of the rotary element into a translational movement of the shaft being inserted between the lock shaft and the rotary element. The rotary element is actuated by an operator when the connectors need to be coupled or uncoupled.

WO 2013/074,047 in particular describes a lever intended to be actuated by an operator and driving the rotation of an element rotating inside a frame. A control finger is secured in rotation with the rotary element and is engaged in a sliding lock shaft, guided in translation inside the frame. The flared end of the lock shaft cooperates with the friction balls housed in a locking ring pushed back by a spring toward the end of the lock shaft. This ring engages in a bushing of a second plate upon connection. The withdrawal movement of the lock shaft 2 then causes the engagement of the friction balls in the bushing, then the approach of the plates and the connection of the connectors. A pin makes it possible to lock the position of the rotary element in the approached coupled configuration in which the connectors are coupled.

Similar devices are also described in JPH 07 208 673 and U.S. Pat. No. 8,864,179.

These multi-couplings plates are intended to be placed very close to machines, injection presses for example, which the connectors supported by the multi-couplings plates make it possible to supply with fluid or electricity, and depending on the installation, operator access to the locking device may be limited.

During the connection, the fluid connectors have spring-mounted valves that create repellent forces that the locking device must counteract. This means that the operator must sometimes exert a significant force upon coupling.

The invention aims to resolve these drawbacks by proposing a new multi-couplings plate that is more ergonomic for the operator, in particular in terms of access to the locking device or repellent forces.

To that end, the invention relates to a multi-couplings plate for the simultaneous connection of several fluid and/or electrical couplings, the plate having a locking device in a connecting direction for connector elements supported by the plate to complementary connector elements supported by a second plate, the locking device comprising a frame fixed on the plate, locking members and a drive mechanism, the drive mechanism comprising:
- a rotary element mounted rotating in the frame, between an uncoupled configuration and a coupled configuration of the plate,
- a sliding element translatable relative to the frame along the connecting direction and which cooperates with the locking members, the locking members being movable relative to the sliding element between a first unlocked position where they free a passage for the second plate relative to the sliding element, and a second locked position where they are able to secure the sliding element and the second plate in the connecting direction,
- one or more elements for converting the rotational movement of the rotary element into a translational movement of the sliding element, in the uncoupled configuration, the sliding element is in a forward position relative to the frame and the locking members are able to come into their first unlocked position, in the coupled configuration, the sliding element is in a withdrawn position relative to the frame and the locking members are able to come into their second locked position.

This multi-couplings plate is characterized in that the locking device also comprises:
- several ratchet notches secured to an element of the drive mechanism and juxtaposed in the movement direction relative to the frame of the element of the drive mechanism, the ratchet notches comprising a final notch and at least one intermediate notch, and
- a pawl movable in a housing of the frame and pushed back by a spring toward one of the ratchet notches;

and in that:
- when the pawl cooperates with the intermediate notch, the pawl limits the movement of the sliding element toward its forward position to a position midway between the forward position and the withdrawn position, and
- in the coupled configuration, the pawl cooperates with the final notch and keeps the sliding element in the withdrawn position.

Owing to the invention, the pawl system allows the operator to exert successive rotations of small amplitude of the rotary element to obtain a gradual approach of two multi-couplings plates and a connection of the connectors, which allows better ergonomics in case of difficult access and substantial force to be supplied.

According to advantageous but optional aspects of the invention, such a multi-couplings plate may incorporate one or more of the following features, considered in any technically allowable combination:
- In the engagement configuration in one of the ratchet notches, the pawl is mounted in the frame with the possibility of sliding along a sliding axis, preferably parallel to the connection direction.
- The pawl is able to be pushed back by the spring in cooperation along the sliding axis with a surface of the frame into a maintenance position of the pawl in which the pawl is freed relative to the ratchet notches.
- The pawl is equipped with at least one protruding pin, the frame comprises a longitudinal groove oriented along the sliding axis of the pawl and a maintaining notch in which the longitudinal groove emerges circumferentially with respect to the sliding axis, the pin cooperates with the longitudinal groove in the engaged configuration of the pawl in one of the ratchet notches, and the pawl is in the maintaining position when the pin is engaged in the maintaining notch.
- The ratchet notches are arranged on the rotary element.
- Each intermediate and final ratchet notch is delimited by a bottom and a stop surface that protrudes from the bottom and, in the engagement configuration in one of the intermediate and final ratchet notches, the pawl forms an obstacle to the stop surface in a movement direction of the element of the drive mechanism with ratchet notches between the coupled configuration and the uncoupled configuration.
- A ratchet amplitude of the drive mechanism corresponds to a 20° to 40° rotation of the rotary element in the frame.
- The depth of each intermediate notch is variable.

The depth of the final ratchet notch is greater than the maximum depth of the intermediate ratchet notches.

The pawl has a visual marker, visible on the outside of the locking device except when the pawl cooperates with the bottom of the final ratchet notch.

The locking members are in their second locked position when the pawl is engaged in the first or second intermediate notch.

The rotary element is secured in rotation with an engagement profile for a tool, this engagement profile being accessible from outside the frame.

The elements for converting the rotational movement of the rotary element into a translational movement of the sliding element comprise a control finger, the central longitudinal axis of which is offset from the rotation axis of the rotary element, the control element being connected in rotation around the rotation axis with the rotary element and connected in translation with the sliding element along the connecting direction, the sliding element being guided by a housing of the frame in its translational movement.

The sliding element comprises a lock shaft with a portion having a smaller diameter and a flared end, a locking ring surrounds the lock shaft and houses friction balls forming the locking members, the locking ring being movable relative to the lock shaft between a retracted position in which the friction balls are able to enter their first unlocked position, with the friction balls cooperating with the portion of smaller diameter and being withdrawn from the outer radial surface of the locking ring, and a forward position in which the friction balls are pushed radially back by the flared end into their second locked position, protruding from the outer radial surface of the locking ring, a spring returning the locking ring toward its forward position.

The invention also relates to an ensemble of plates with a first multi-couplings plate as mentioned above and a second complementary plate, the second plate bearing a locking element defining a receiving volume capable of receiving the locking members, characterized in that in the coupled configuration of the first plate with the second plate, the locking members are in their position locked and engaged in the receiving volume of the locking element and the connector elements are coupled to the complementary connector elements.

The invention will be better understood and other advantages thereof will appear more clearly in light of the following description of a multi-couplings plate and a set of plates according to its principle, provided as a non-limiting example and in reference to the appended drawings, in which.

Figure 1:
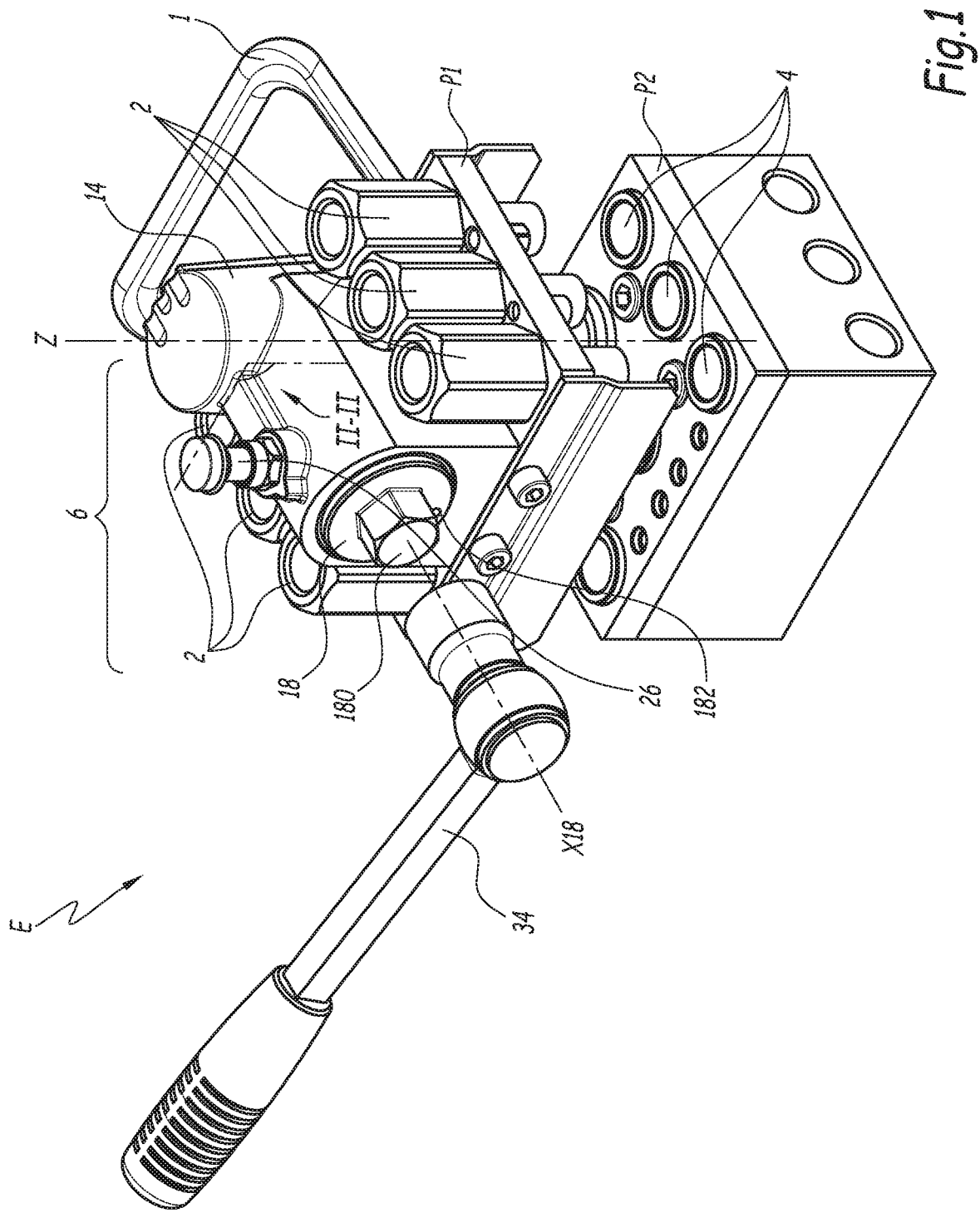
FIG. 1 is a perspective view of a set of plates according to the invention, comprising a multi-couplings plate according to the invention and a second complementary plate, in the uncoupled configuration, FIG. 1 also showing an actuating key.

FIG. 1 shows a set of plates E comprising a first plate P1 and a complementary second plate P2. The first plate P1 comprises connector elements 2, each connector element 2 being arranged at the end of a fluid or electricity pipe. The second plate P2 comprises connector elements 4 complementary to the connector elements 2, each complementary connector element 4 being arranged at the end of a fluid or electricity pipe. Each connector element 2 is intended to be coupled to a complementary connector element 4 in order to form a fluid or electrical coupling R by connecting their respective pipes, not shown. The first plate P1 and the second plate P2 are multi-couplings plates for the simultaneous connection of several connectors, six in the illustrated example.

The plates P1 and P2 extend in planes perpendicular to a direction Z that also constitutes a connection direction for the first plate P1 with the second plate P2. This connection direction Z is the direction in which the plates P1 and P2 are brought together during a locking and connection operation. The direction Z is vertical in this example, but may be oriented differently.

In the rest of the description, the term "front" for an element of the plate P1 refers to a side oriented toward the plate P2 facing it, and the term "rear" refers to the opposite side relative to the plate P2 facing it.

The terms "axial" and "radial" are used to refer to surfaces of an element that are respectively perpendicular or surrounding a central reference axis of the element. The terms "axially" and "radially" refer to a direction respectively parallel or orthogonal to said reference axis.

For a considered element, the terms "inner" and "outer" refer to parts or surfaces respectively oriented on the side of a central axis of said element or the side opposite the central axis of said element.

For a considered element, the terms "circumferential" and "circumferentially" refer to a part, surface or orientation extending along a direction of revolution around a central reference axis of said element.

The first plate P1 is movable relative to the complementary second plate P2, which is intended to be fixed on a machine, for example an injection press. The first plate P1 in particular comprises a handle 1 for grasping of the plate P1 by the operator.

The first plate P1 is equipped with a locking device 6, which is suitable for bringing the first plate P1 closer to the second plate P2 along the connecting direction Z, and locking the two plates P1 and P2 in the coupled direction of the connector elements 2 and 4. When the plates P1 and P2 are brought together and locked, all of the connectors supported by the first and second plates P1 and P2 are simultaneously connected.

The plates P1 and P2 comprise guide elements making it possible to guide their approach. The plate P1 to that end comprises a guide element formed by a cylindrical column 8, extending parallel to the connection direction Z, and the second plate P2 comprises a guide element formed by a cylindrical bushing 10 also extending parallel to the connection direction Z. The inner diameter of the bushing 10 is substantially equal to the outer diameter of the column 8, which allows the insertion with reduced play of the column 8 into the bushing 10 when the plates P1 and P2 are brought together. Alternatively, the column 8 can be supported by the second plate P2 and the bushing 10 by the plate P1.

The second plate P2 is equipped with a locking bushing 12 able to cooperate with the locking device 6 for the approach and locking of the plates P1 and P2. The locking bushing is centered on axis Z12 parallel to the direction Z undergoing coupling. The locking bushing 12 is fixed on the second plate P2, therefore secured to the second plate P2, and comprises an inner bore 120 and a tightened part 122 with a narrow inner diameter, on the side of the first plate P1 being coupled. The inner diameter of the bore 120 is wider relative to that of the tightened part 122.

The locking device 6 comprises a frame 14 and a drive mechanism 16. The frame 14 is fastened on the plate P1 by screws, not shown, and is therefore secured to the plate P1, in particular in the direction Z. The drive mechanism 16 comprises a rotary element 18 that is rotatable relative to the frame 14 around a central longitudinal axis X18 of the rotary element 18, perpendicular to the connection direction Z. The rotation of this rotary element 18 is guided relative to the frame 14 along the axis X18 by a cylindrical housing 140 of the frame 14 centered on the axis X18.

The rotary element 18 comprises a hexagonal protrusion 180 that is coaxial to the axis X18 and that extends outside the frame 14 perpendicular to the connecting direction Z. This hexagonal direction 180 makes it possible for a tool 34 of the key type, having a complementary hexagonal shape, to be able to be engaged by an operator around the hexagonal protrusion 180 so as to actuate the locking device 6.

Figure 7:
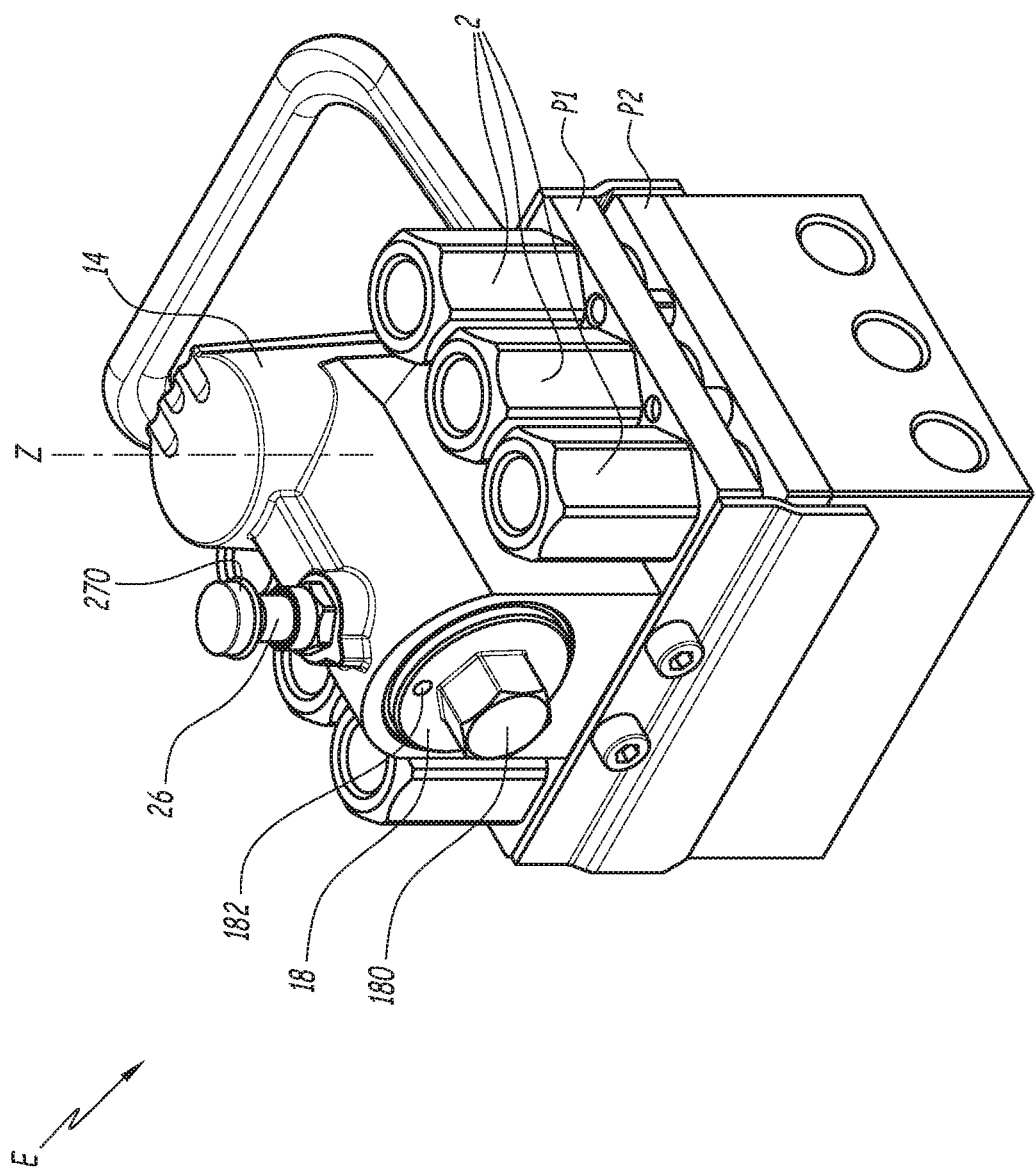
FIG. 7 is a perspective view of the set of plates of FIG. 1, in the coupled configuration.

As shown in FIGS. 1 and 7, a visual reference 182 is secured to the rotary element 18 to identify the angular position of the rotary element 18 around the axis X18. This visual reference 182 is visible from outside the frame 14 around the hexagonal protrusion 180.

The drive mechanism 16 also comprises a sliding element 20 that is translatable relative to the frame 14 along an axis Z20 parallel to the connecting direction Z.

Figure 3:
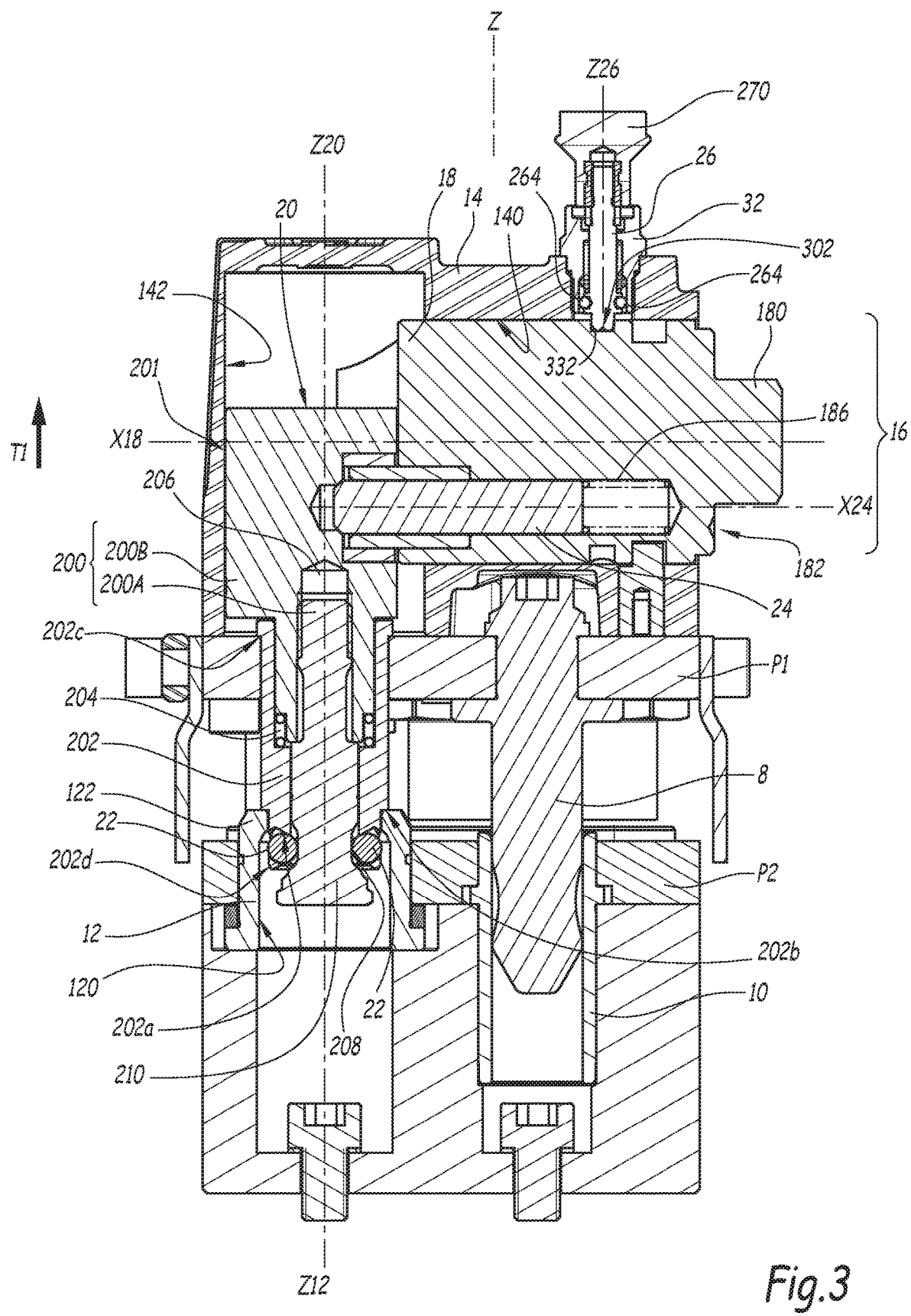
FIG. 3 is a sectional view along plane III-III in FIG. 2, of the multi-couplings plate of FIG. 1 engaged in the second complementary plate.
Figure 6:
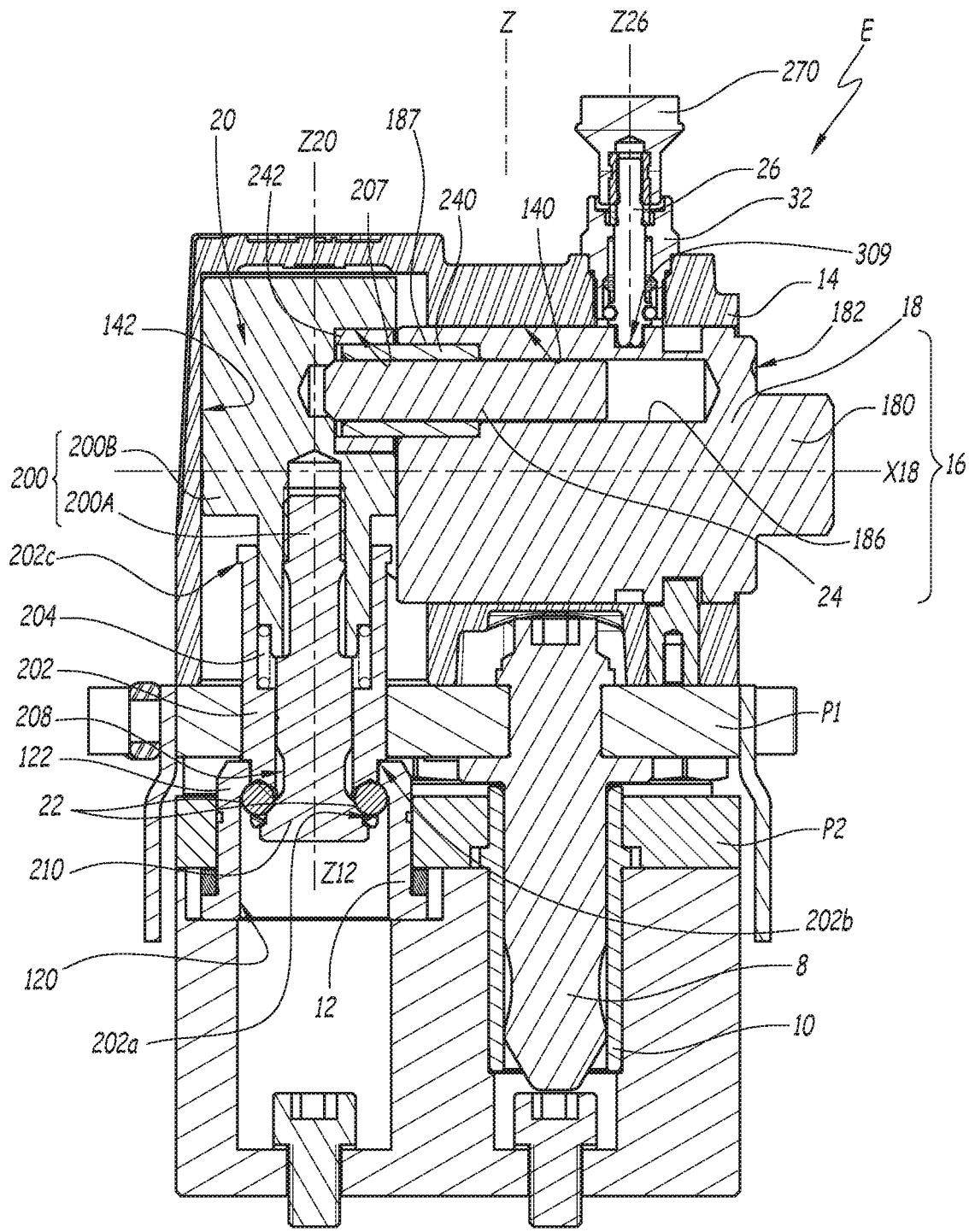
FIG. 6 is a sectional view similar to FIG. 3 of the set of plates in the coupled configuration.

The locking device 6 also comprises locking members that are, in this example, formed by balls 22, for example eight balls 22, the sliding element 20 cooperating with the friction balls 22 such that the friction balls 22 are movable relative to the sliding element 20, between a first retracted unlocked position, shown in FIG. 3, and a second protruding locked position, shown in FIG. 6. In the first unlocked position, the friction balls 22 are retracted outside a receiving volume 23 arranged around the sliding element 20 and intended to partially receive the locking bushing 12 of the second plate P2 and free the passage for the bushing 12 relative to the sliding element 20 along the axis Z20. In this configuration, the sliding element 20 is free to slide along the axis Z20 relative to the bushing 12, in particular in the tightened part 122.

In their second locked position, the friction balls 22 protrude radially in the receiving volume 23 and when the bushing 12 is engaged in the receiving volume 23, lock the bushing 12 with the sliding element 20 along the axis Z while forming an obstacle to the separation of the first plate P1 from the second plate P2 along the axis Z, since the locking balls 22 are stopped by the part of smaller diameter 122. The friction balls 22 are capable of assuming their first retracted position in an unlocked configuration of the locking device 6 uncoupled from the plate P2, which allows the insertion or withdrawal of the sliding element 20 in or from the locking bushing 12.

The sliding element 20 comprises a lock shaft 200. A locking ring 202 surrounds the lock shaft 200 with the possibility of relative axial movement with respect to the lock shaft 200 along the axis Z20, which is also a central longitudinal axis of the ring 202. The locking ring 202 houses the friction balls 22 owing to through housings 202a that are inclined relative to a direction perpendicular to the axis Z20. The housings 202a are tighter at their outer mouth so as to keep each of the balls 22 in its housing 202a. A spring 204 is inserted between the lock shaft 200 and the locking ring 202 and pushes the locking ring 202 toward a forward position relative to the lock shaft 200, shown in FIG. 6. In FIG. 3, the locking ring 202 is in a withdrawn rear position relative to the lock shaft 200, the spring 204 being more compressed than when the locking ring 202 is in its forward position relative to the lock shaft 200.

The locking ring 202 comprises a forward shoulder 202b able to abut axially against the locking bushing 12 during the coupling along the axis Z, and a rear shoulder 202c capable of abutting against the plate P1. The forward shoulder 202b and an outer radial surface 202d of the locking ring 202 delimit the receiving volume 23 of the bushing 12 around the sliding element 20.

The lock shaft 200 comprises a front part 200A and a rear part 200B. The front part 200A is located on the side of the second plate P2 and is screwed in a bore 206 of the part 200B. The axis Z20 constitutes a central longitudinal axis of the front part 200A. The part 200B is translatable along the axis Z20 relative to the frame 14 with a cylindrical outer surface 201 of the part 200B guided in a cylindrical housing 142 of the frame 14. The front part 200A comprises a portion of smaller diameter 208, and a flared portion 210. In the withdrawn position of the locking ring 202 relative to the lock shaft 200, the portion of smaller diameter 208 is aligned with the inner mouths of the housings 202a, which allows the friction balls 22 to reach their retracted inner radial position, radially withdrawn from the outer radial surface 202d. When the locking ring 202 reaches its forward position relative to the lock shaft 200 under the action of the spring 204, the flared end 210 pushes the friction balls 22 radially outward, in reference to the axis Z20, into their second protruding outer radial position, in which they protrude radially from the outer radial surface 202d of the locking ring 202. In the forward position of the locking ring 202 relative to the lock shaft 200, the forward movement of the ring 202 along the direction Z20 is stopped by the balls 22, which cooperate radially and axially with the flared end 210 of the lock shaft 200.

In the uncoupled configuration of the plate P1, the rear shoulder 202c abuts against the first plate P1 and the locking ring 202 is kept in its withdrawn position relative to the lock shaft 200, which is in the forward position relative to the frame 14.

In the withdrawn position of the locking ring 202 relative to the lock shaft 200, the friction balls 22 cooperate with the portion of smaller diameter 208 of the screwed part 200A and can retract in the locking ring 202 so as not to protrude radially outside the locking ring 202. The diameter of the outer radial surface 202d of the locking ring 202, at each housing 202a of the friction balls 22, is substantially equal, to within any operating play, to the inner diameter of the locking bushing 12 in its tightened part 122. Thus, when the friction balls 22 are in the unlocked position, retracted in the locking ring 202, the locking ring 202 and the lock shaft 200 can be partially inserted into the inner bore 120 of the locking bushing 12.

Figure 2:
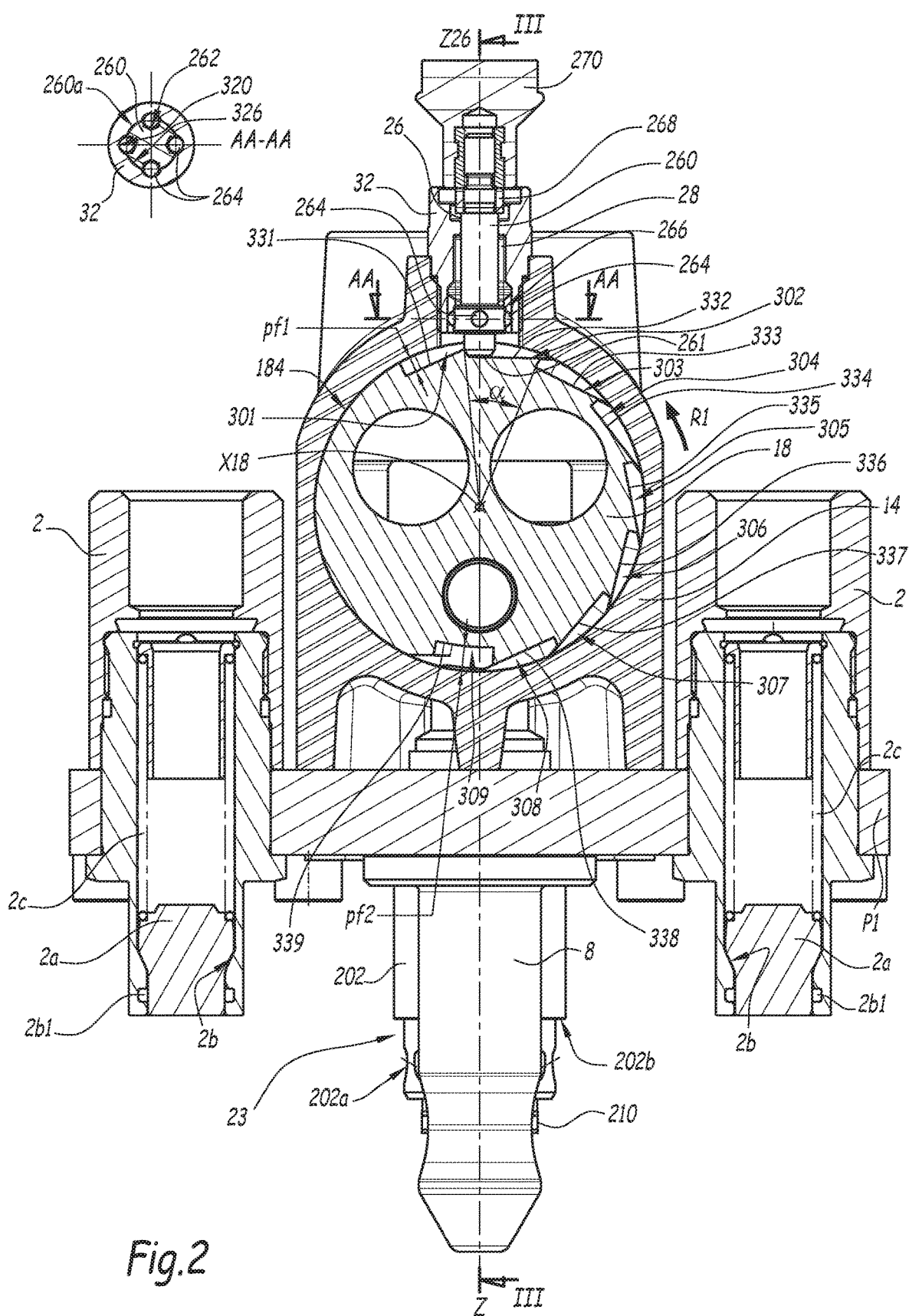
FIG. 2 is a cross-sectional view of the multi-couplings plate of FIG. 1 along plane II-II.

In the unlocked configuration of the locking device 6 and uncoupled configuration of the plate P1, in which the connector elements 2 and 4 are uncoupled, the guide column 8 protrudes forward along the connecting direction Z relative to the lock shaft 200, which is in its forward position relative to the frame 14, as shown in FIG. 2.

In the illustrated example, the connector elements 2 and 4 are fluid connector elements. In the uncoupled configuration, a valve 2a of each connector element 2 is in the closed position against a seat 2 with a sealing gasket 2b1 inserted between the valve 2a and the seat 2b, under the action of springs 2c. This configuration is shown in FIG. 2. On the second plate P2, the connector elements 4 also each comprise a valve 4a that is kept in the sealed closed position in the uncoupled configuration by a spring 4b.

The drive mechanism 16 also comprises one or more elements for converting the rotational movement of the rotary element 18 around the axis X18 into a translational movement of the sliding element 20 along the axis Z20. In the illustrated example, the rotary element 18 is secured in rotation around the axis X18 of a control finger 24, the central longitudinal axis X24 of which extends parallel to the rotation axis X18 offset relative to said axis X18. The control finger 24 is housed in a housing 186 of the rotary element 18. A bearing ring 240 mounted around a control finger 24 and in a housing 187 of the rotary element 18 is engaged in a roller 242 sliding in a notch 207 of the part 200B of the lock shaft 200, transverse to the axis Z20, along a direction perpendicular to the plane formed by the axes Z20 and X18. Since the lock shaft 200 is guided along the sliding axis Z20 by the housing 142, the movement of the control finger 24 around the axis X18 is converted into an axial movement along the axis Z20 of the part 200B and causes the driving of the sliding element 20. Thus, the position of the rotary element 18 in the housing 14 around the axis X18 conditions the position of the front part 200A and the rear part 200B of the sliding element 20 in the frame 14 along the axis Z20.

According to the invention, the locking device 6 also comprises a pawl 26. The pawl 26 is mounted movable in a housing of the frame 14 and pushed back by a spring 28 toward one of several ratchet notches secured to an element of the drive mechanism 16 and juxtaposed in the movement direction relative to the frame 14 of the element of the drive mechanism 16 to which the ratchet notches are secured. In a ratchet configuration, the pawl 26 is mounted movably relative to the frame 14 along a sliding axis Z26 while being secured to the frame 14 in a circumferential direction around the axis X18. In this example, the ratchet notches are provided on the rotary element 18, which forms a ratchet wheel or a sprocket wheel. The ratchet notches are arranged in hollows from a cylindrical outer radial surface 184 of the rotary element 18 and are therefore juxtaposed along a circumferential direction around the axis X18.

The ratchet notches comprise a final notch and at least one intermediate notch. More specifically, in the illustrated example, there are nine ratchet notches 301 to 309 over an angular amplitude of 200° around the axis X18. In the ratchet configuration, the pawl 26 is engaged in one of the ratchet notches 301 to 309. The ratchet notches 301 to 308 are made with a flat bottom 331 to 338, and the depth of each ratchet notch 301 to 308, taken relative to the outer radial surface 184 radially to the axis X18, is variable. The ratchet notches are thus separated from one another by dips forming stop surfaces 324 each extending in a plane passing through the axis X18. The maximum radial depth pf1 of a notch 301 to 308 is at the stop surface 324 protruding relative to the bottom of the considered notch, while the radial depth of the notch decreases gradually to the adjacent hollow stop surface 324. The notch 301 can be omitted, the notch 302 forming the initial notch. The notches 303 to 308 form intermediate ratchet notches. The ninth notch, called final notch 309, is made with a bottom 339 that extends circumferentially the axis X18 and has a radial depth pf2, taken relative to the outer radial surface 184, radially to the axis X18, strictly greater than the maximum radial depth pf1.

The pawl 26 is mounted in a housing 326 of a stopper 32 of the frame 14, screwed in a housing of the frame 14 such that the housing 326 of the stopper 32 emerges in the housing 140 and on the outside of the locking device 6. The sliding direction of the pawl 26 is preferably radial relative to the rotation axis X18 of the rotary element 18. The sliding axis Z26 of the pawl 26 is preferably parallel to the connection direction Z.

Figure 8:
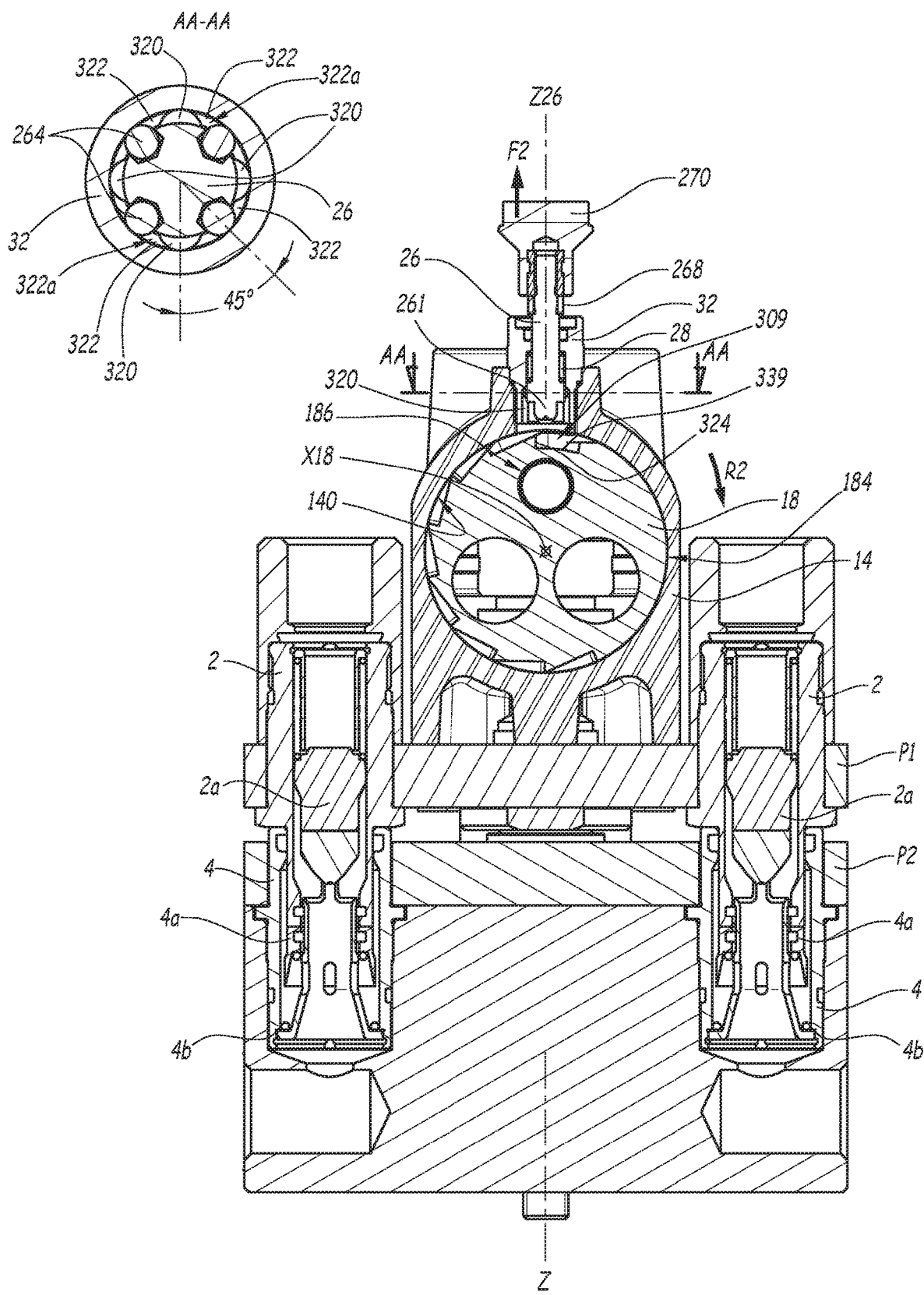
FIG. 8 is a sectional view similar to FIG. 5, during a disconnection step.

The pawl 26 comprises a body 260 of revolution centered on the axis Z26 and provided with four sphere portion bodies 262 visible in the sectional views AA-AA of FIGS. 2 and 8 and regularly distributed around the axis Z26. Each of said housings 262 receives a guide ball 264, which protrudes radially outside an outer radial surface 260a of the body 260. The guide balls 264 form pins of the pawl 26 that cooperate with grooves 320 of the stopper 32 that are provided along a longitudinal direction of the stopper 32 parallel to the sliding axis Z26. The grooves 320 are provided on the inner surface of the housing 326, which in turn is centered on the sliding axis Z26.

The spring 28 is engaged between the stopper 32 and a shoulder 266 of the pawl 26 that bears the housings 262 such that, when the guide balls 264 are engaged in the longitudinal grooves 320, the pawl 26 is elastically returned toward the axis X18, in contact with the rotary element 18 and the end 261 of the pawl 26 cooperates with the bottom 331-339 of one of the nine notches 301 to 309.

The pawl 26 also comprises a ring 268 that surrounds the body 260 and is secured to the body 260 in the direction of the sliding axis Z26. The ring 268 forms a visual marker, for example with a different color and/or texture from the body 260, which, depending on the position of the pawl 26 along its sliding axis Z26, is made partially visible from outside the locking device 6 or hidden by the stopper 32.

The pawl 26 lastly comprises a head 270 screwed on the body 260 and which protrudes past the stopper 32 outside the locking device 6 so that it can be manipulated by an operator.

The housing 326 of the stopper 32 further forms four maintaining notches 322 that extend in a same direction circumferential to the axis Z26. Each of the four maintaining notches 322 extends between two adjacent longitudinal grooves 320. The maintaining grooves 322 are arranged around the axis Z26 at the end of the longitudinal grooves 320 located opposite the ratchet notches 301 to 309. When the guide balls 264 cooperate with the maintaining notches 322, the pawl 26 is in the maintaining position, i.e., kept in an outer radial position in reference to the axis X18, against the force of the spring 28 and in which the end 261 is retracted outside the housing 140, and is freed from the ratchet notches 301 to 309, as shown in FIG. 8. In the maintaining position of the pawl 26, each guide ball 264 cooperates with a surface 322a, visible in FIGS. 4 and 8, of the maintaining notch 322 in which it is engaged. This surface 322a of the maintaining notch 322 is inserted along the axis Z26 between the guide balls 264 of the pawl 26 and the rotary element 18 with ratchet notches 301-309 and prevents the sliding of the pawl 26 along the axis Z26 toward the ratchet notches 301-309.

The passage of the guide balls 264 from the longitudinal grooves 320 toward the maintaining notches 322 requires the operator to exert a pulling force on the head 270 of the pawl 26 along the sliding axis Z26 to overcome the force of the spring 28 and a 45° rotation of the pawl 26 around the sliding axis Z26, this rotation being exerted indifferently in one direction or the other, since each longitudinal groove 320 emerges circumferentially on two maintaining notches 322. The passage of the guide balls 264 from the maintaining notches 322 toward the longitudinal grooves 320 requires the operator to exert a simple 45° rotation of the pawl 26 around the sliding axis Z26, irrespective of the rotation direction. Thus, between the maintaining position of the pawl 26 and the position of the pawl 26 in the ratchet configuration, the pawl 26 has undergone a rotation in the frame 14 around the sliding axis Z26. In the section AA-AA of the stopper 32 and the pawl 26 in FIG. 8, the 45° offset between the guide balls 264 and the longitudinal grooves 320 is visible.

The operation of the set of plates E is described hereinafter. In the uncoupled configuration of the first plate P1, the pawl 26 is in the ratchet configuration: the guide balls 264 are engaged in the longitudinal grooves 320 and the end 261 of the pawl 26 is engaged in the initial ratchet notch 302 (FIG. 2). The pawl 26 is resiliently returned into contact with the bottom 332 of the ratchet notch 302 by the spring 28. The lock shaft 200 is in the forward position relative to the frame 14 along the axis Z20. When it involves coupling and locking the two plates P1 and P2 together, the first plate P1 is brought closer to the second plate P2 along the connecting direction Z. The guide elements formed by the column 8 and the first plate P1 engage with the complementary guide elements formed by the bushing 10 of the second plate P2 to guide the approach of the plates along the connecting direction Z. The lock shaft 200 next engages in the locking bushing 12 and, when the friction balls 22 arrive level with the locking bushing 12, the friction balls 22 retract inside the locking ring 202 in the unlocked position under the action of the tightened portion 122 and owing to the space offered by the portion of smaller diameter 208 of the lock shaft 200, which is aligned with the inner mouths of the housings 202a in this configuration. The retraction of the friction balls 222 allows the engagement of the locking ring 202 and the friction balls 22 in the locking bushing 12 in the inner bore 120, in particular level with the part of smaller inner diameter 122, then the inner bore 120 of wider inner diameter.

The locking ring 202 abuts against the locking bushing 12 at the front shoulder 202b (FIG. 3). From this configuration, the locking and the approach of the plates P1 and P2 can be initiated. A key 34 is placed by the operator around the hexagonal protrusion 180 and rotates said hexagonal protrusion 180, and therefore the rotary element 18, around the axis X18. The rotary element 18 is rotated over an angular amplitude corresponding at least to the angular expanse around the axis X18 of the ratchet notch 302 in which the end 261 of the pawl 26 is engaged. The angular expanses of the ratchet notches 301 to 308 are substantially identical. The ratchet amplitude of the drive mechanism 16 corresponds to the movement amplitude of each element of the drive mechanism 16 in order for the pawl 26 to engage in the following notch. The ratchet amplitude corresponds to a rotation of the rotary element 18 over the angular expanse a of each ratchet notch 301 to 308, or a rotation of the rotary element 18 substantially equal to 30° or preferably between 20° and 40°. This rotation along the arrow R1 in FIG. 2 causes the movement of the lock shaft 200 toward its withdrawn position in the frame 14, along arrow T1 in FIG. 3. During this rotational movement along arrow R1, the pawl 26 is kept resiliently in contact with the bottom 332 of the ratchet notch 302 by the spring 28 and therefore follows the geometry of the bottom 332 of the notch 302 in which it is engaged. Due to the variable radial depth of each of the ratchet notches 301 to 308, the pawl 26 moves along the sliding axis Z26, away from the axis X18 outward, the guide balls 264 sliding in the longitudinal grooves 320 until the pawl 26 engages in the following ratchet notch 303, which is the first intermediate ratchet notch, and comes into contact with the bottom 333 of said following notch 303 by sliding of the pawl 26 under the force of the spring 28. In this configuration, called intermediate configuration, even if the operator releases the action of the actuating key 34, the inverse rotational movement of the rotary element 18 in the direction opposite arrow R1, and therefore the movement of the lock shaft 200 relative to the frame 14, in the direction opposite arrow T1, is limited by the abutment of the end 261 of the pawl 26 on the stop surface 324 separating the ratchet notch 303 from the preceding initial ratchet notch 302. Each stop surface 324 of the rotary element 18 is oriented away from the movement direction of arrow R1. The pawl 26 forms an obstacle to the stop surface 324 of the rotary element 18 in the rotational movement of the rotary element 18 in the direction opposite arrow R1. The pawl 26 limits the movement of the lock shaft 200 toward its forward position to an intermediate position relative to the frame 14 between its forward position of the uncoupled configuration and its withdrawn position of the coupled configuration. The intermediate position is different from the forward position and the withdrawn position. The operator can continue the rotation of the key 34 in the direction of arrow R1 or return the key 34 toward its initial position owing to a ratchet wrench system, while the rotary element 18 retains its angular position and the sliding element 20 retains its intermediate position, and again rotate the hexagonal protrusion 180 at least over an amplitude corresponding to the ratchet amplitude, or a rotation of about 30° of the rotary element 18, which allows the pawl 26 to engage in the following ratchet notch 304.

Figure 4:
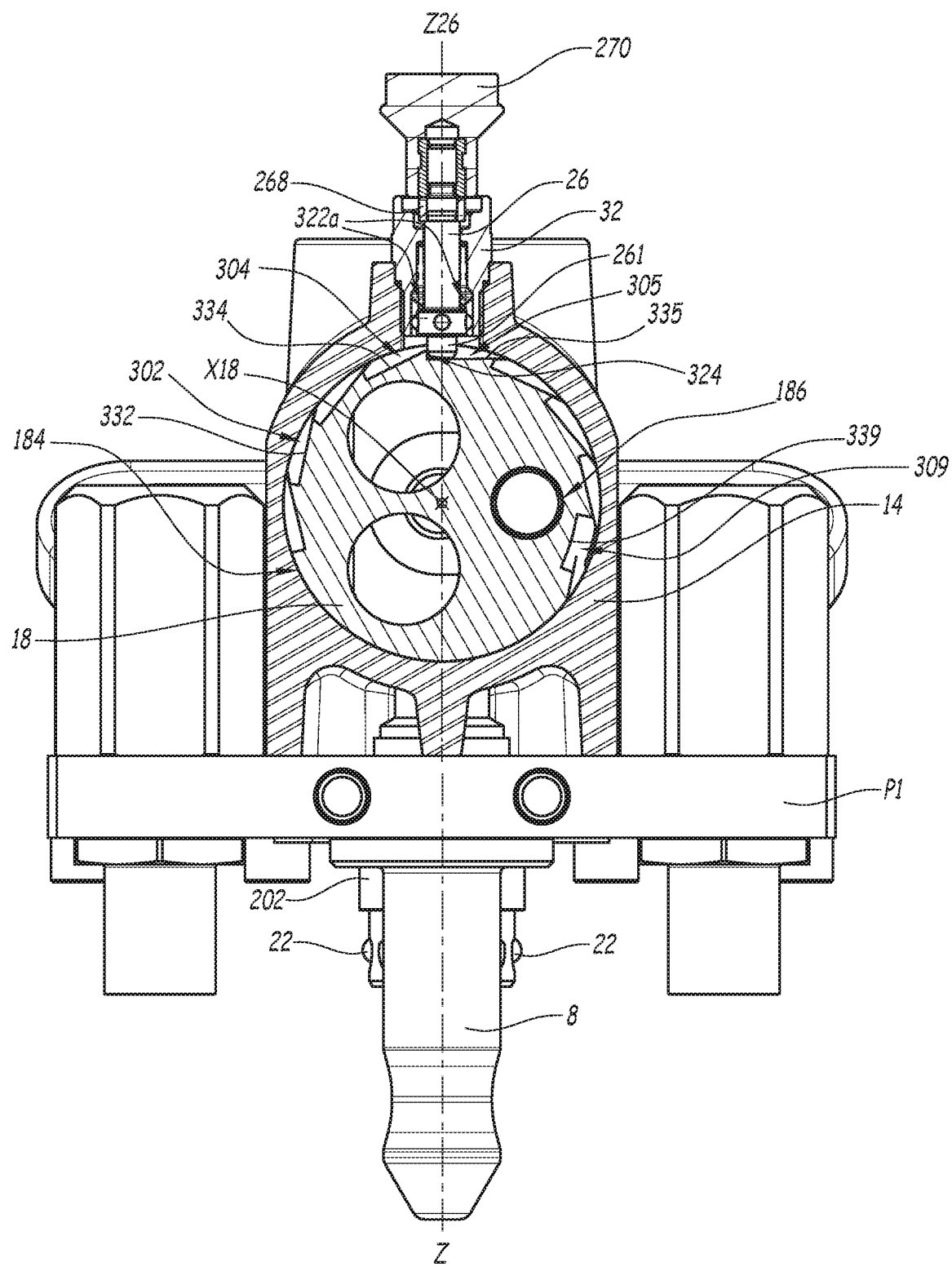
FIG. 4 is a sectional view similar to FIG. 2, in an intermediate coupling configuration of the multi-couplings plate, the complementary plate being omitted.

The crossing of the successive ratchet notches continues. In particular in FIG. 4, showing an intermediate coupling configuration, the inverse rotational movement of the rotary element 18 in the direction opposite arrow R1 is prevented by the abutment of the end 261 of the pawl 26 on the stop surface 324 separating the ratchet notch 305, in which the pawl 26 is engaged, from the previous ratchet notch 304. During coupling, when the pawl 26 slides in the housing 326 in the ratchet configuration, the guide balls 264 do not come to the level of the maintaining notches 322 along the axis Z26. The maintaining position of the pawl 26 is therefore offset along the axis Z26 relative to the positions assumed by the pawl 26 in the ratchet configuration.

Then, the pawl 26 reaches the final notch 309 and the rotary element 18 reaches an amplitude-limiting stop, not shown. When the pawl 26 is engaged in an intermediate notch 303-308 and the end 261 of the pawl 26 abuts on the stop surface 324 protruding from the bottom 333-338 of the intermediate notch 303-308, the pawl 26 keeps the lock shaft 200 in an intermediate position and prevents the lock shaft from reaching its forward position.

From the uncoupled configuration to the coupled configuration in which the pawl 26 is engaged in the final notch 309, the rotary element 18 has undergone a 180° rotation, preferably from 160° to 200°, along arrow R1, which places the visual reference 182 in a position offset by 180° relative to its initial position, which allows the operator to view the end of travel of the locking device 6. The visual reference 182 is visible by the operator even when the key 34 is engaged on the hexagonal protrusion 180.

Figure 5:
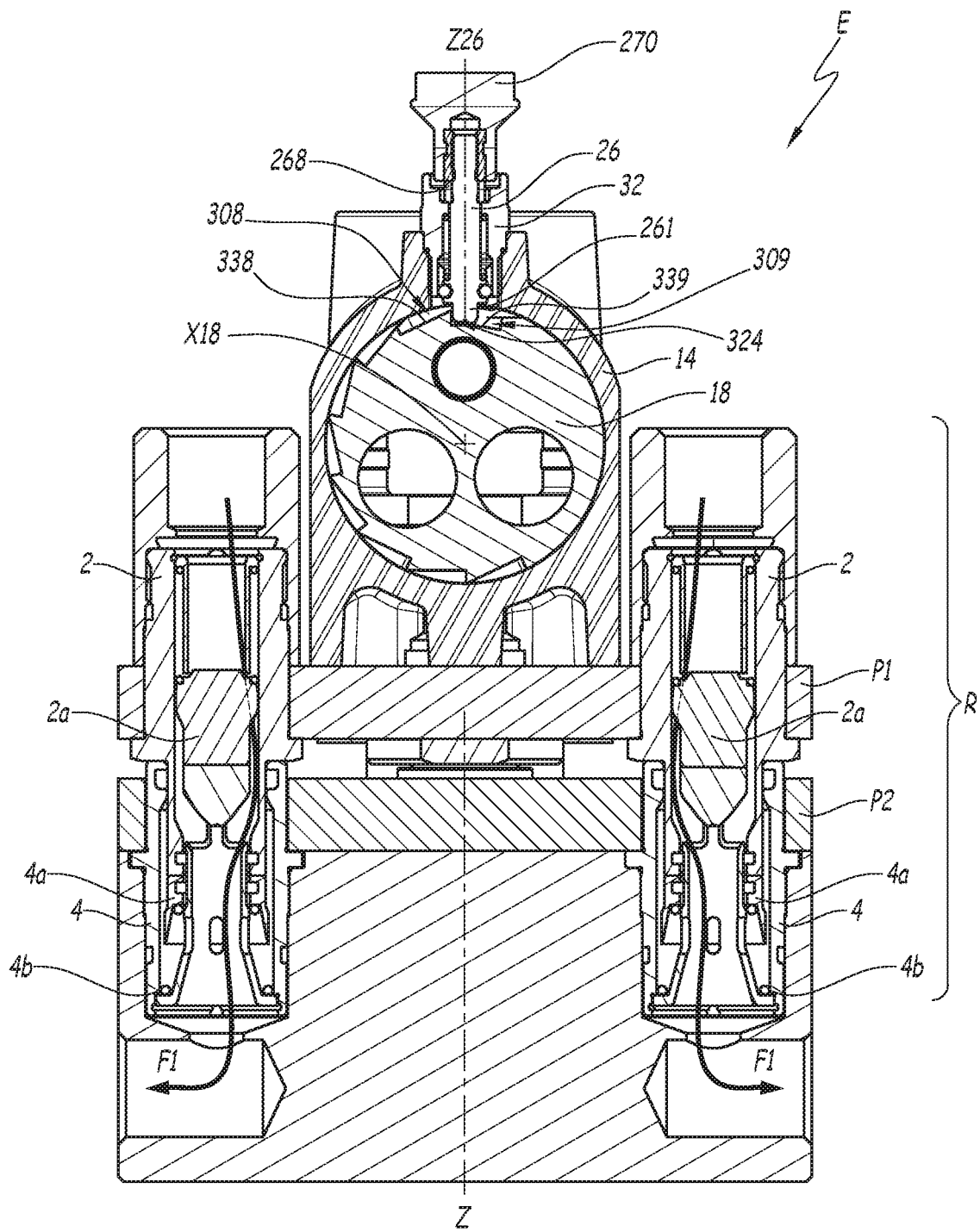
FIG. 5 is a sectional view similar to FIGS. 2 and 4, in a coupled configuration of the set of plates of FIG. 1.

Furthermore, when the pawl 26 cooperates with the initial notch 302 and during the movement of the pawl 26 in the intermediate ratchet notches 303 to 308, the colored ring forming the visual marker 268 remains visible by the operator, since it is only partially hidden by the stopper 32. In the coupled configuration of the plate P1, the pawl 26 is in the ratchet configuration engaged in the final notch 309 (FIG. 5) and in contact with the bottom 339. Due to the difference in depth between the radial depth pf2 of the final notch 309 and the maximum radial depth pf1 of the notches 301 to 308, the end 261 of the pawl 26 is closer to the axis X18 and the colored ring 268 is completely hidden by the stopper 32. This tells the operator that the final notch 309 has been reached and that the coupled locked configuration has been obtained.

Between the uncoupled configuration and the coupled configuration, the rotary element 18 has rotated the control finger 24 around the axis X18, translated the roller 242 along the axis Z20, which in turn has slid the lock shaft 200 along the axis Z20 from its forward position relative to the frame 14 (FIG. 3) to its withdrawn position relative to the frame 14 (FIG. 6). The lock shaft 200 then moves relative to the locking ring 202, which is pushed resiliently back toward its forward position. In the forward position of the locking ring 202 relative to the lock shaft 200, the friction balls 22 cooperate with the flared end 210 and are pushed back into the locked position, protruding partially past the outer radial surface 202d. The friction balls 22 are engaged in the inner bore 120 and then form an obstacle connecting the locking bushing 12 and the screwed part 200A of the lock shaft 200 along the axis Z20. Indeed, the friction balls 22 withstand a force separating the plates P1 and P2 and transmit, to the locking bushing 12, the movement of the lock shaft 200 toward its withdrawn position. Advantageously but optionally, the rotation of the rotary element 18 allowing the engagement of the pawl 26 from the initial notch 302 into the first intermediate notch 303, adjacent to the initial notch 302, or into the second intermediate notch 304, adjacent to the first intermediate notch 303, moves the lock shaft 200 relative to the locking ring 202 into a relative position such that the friction balls 22 cooperate with the flared end 210 and protrude toward the outside of the locking ring 202 in the locked position to form an obstacle against the separation of the plates P1 and P2 with the tightened part 122 of the locking bushing 12. Thus, the locking balls 22 are kept in the locked position and the plates P1 and P2 can no longer be separated once the coupling operation has been engaged and the pawl 26 has reached the first intermediate notch 303 or the second intermediate notch 304. Preferably, during coupling, the friction balls 22 are in the locked position once the pawl 26 has reached the first intermediate notch 303.

Continuing the movement of the lock shaft 200 in the frame 14 during the rotation of the rotary element 18 for the connection causes an approach movement of the two plates P1 and P2 because the lock shaft 200 is connected along the axis Z20 to the locking bushing 12 by the friction balls 22, and therefore to the second plate P2. The locking ring 202, pushed back by the spring 204 in the forward position, follows the movement of the lock shaft 200 and the frame 14, the balls 22 remaining kept in the locked position. During the approach of the plates P1 and P2, the connector elements 2 cooperate with the complementary connector elements 4 of the plate P2, the sealing is engaged between a connector element 2 and a complementary connector element 4, the valve 2a and 4a are pushed back, allowing the connection and opening of the fluid pipes connected to the connector elements 2 and 4. In the coupled configuration of the plates, the plates P1 and P2 are in a relative position in which the connector elements 2 are coupled to the intermediate connector elements 4, with opening of the valves 2a and 4a and therefore a fluid communication in the connectors R formed by the coupled connector elements 2 and complementary connector elements 4. The connector elements 2 and 4 are axially abutting against one another. In this configuration, the flow of fluid takes place between the connector elements 2 and the connector elements 4 along the arrows F1 or in the opposite direction depending on the application.

The plate P1 reaches its coupled configuration when the pawl 26 is engaged in the final notch 309. In this coupled configuration, the lock shaft 200 is in the withdrawn position relative to the frame 14 and the pawl 26 limits the rotation of the rotary element 18, and therefore the movement of the lock shaft 200 relative to the frame 14, in the unlocking direction, by the abutment of the end 261 of the pawl 26 against the stop surface 324 separating the final notch 309 from the preceding intermediate notch 308. The lock shaft 200 is kept in its withdrawn position by the pawl 26. In other words, the pawl 26 keeps the sliding element 20 in a position relative to the frame 14 compatible with the coupling of the couplings R and the flow of fluid between the connector elements 2 and the connector elements 4. The return forces of the valves 2a and 4a in the closed position exerted by the springs 2c and 4b tend to move the two plates P1 and P2 apart but cannot separate them, since the pawl 26 maintains the angular position of the rotary element 18 as well as the withdrawn position of the lock shaft 200 relative to the frame 14, preventing it from reaching an intermediate position or its forward position.

For the disconnection, the operator must free the rotary element 18 from its angular movement in the direction opposite arrow R1, and therefore place the pawl 26 in the maintaining position with the guide balls 264 in the maintaining notches 322. To that end, he exerts, on the head 270 of the pawl 26, a pulling force along the axis Z26 along arrow F2 in FIG. 8 against the force of the spring 28, until placing the guide balls 264 abutting against the end of the longitudinal grooves 320, then he exerts a 45° rotation of the pawl 26 around the axis Z26. The guide balls 264 then engage in the maintaining notches 322 and, when the pawl 26 is released by the operator, the guide balls 264 remain engaged in the maintaining notches 322, in contact with the surfaces 322a of the maintaining notches 322 under the return force of the spring 28. The pawl 26 then retains its outer radial position of FIG. 8 in which is radially freed from all of the ratchet notches 301 to 309 of the rotary element 18, the end 261 no longer forming an obstacle to the stop surfaces 324 of the rotary element and not opposing the rotation of the rotary element 18 around the axis X18 in the disconnection direction, along arrow R2. The ring 268 is again visible.

The operator then engages the key 34 on the hexagonal protrusion 180 and drives the rotary element 18 in the direction of the disconnection from the coupled configuration to the uncoupled configuration by a 180° rotation of the key 34 or by successive small amplitude rotations, of about 30°.

The repellent forces of the valves 2a and 4a participate in the movement of the plates P1 and P2 in the direction of the separation. During the rotation of the rotary element 18 in the direction of the disconnection, the lock shaft 200, driven by the control finger 24, is moved in the frame 14 toward its forward position. The plate P2 follows the movement of the lock shaft 200 along the axis Z20, which drives the distancing of the plates P1 and P2, and the connector elements 2 are freed from the complementary connector elements 4, the valves 2a and 4a closing tightly and interrupting the fluid circulation.

The distancing of the plates P1 and P2 continues until the first plate P1 can no longer move away from the second plate P2 with the placement in contact of the rear shoulder 202c of the locking ring 200 against the plate P1. Continuing the movement of the lock shaft 200 relative to the frame 14 toward its forward position then causes the relative movement of the locking ring 202 and the lock shaft 200, the locking ring 202 adopting its withdrawn position in which the friction balls 22 can retract into the locking ring 202 and into the portion of smaller diameter 208. The rotary element 18 reaches an amplitude limiting stop, not shown. The operator grasps the handle 1 and moves the plate P1 away from the plate P2. Under the action of the tightened part 122, the friction balls 22 retract into the locking ring 202 in the unlocked position and are freed from the locking bushing 12. In parallel, the guide elements 8 and 10 cease their cooperation and the two plates P1 and P2 are separated.

To allow a new connection, the pawl 26 must be placed by the operator back in the ratchet configuration engaged with the initial notch 302. To that end, the operator rotates the pawl by 45° around its sliding axis Z26 in order to free the guide balls 264 from the maintaining notches 322 and to engage the guide balls 264 in the longitudinal grooves 320. Under the action of the spring 28, the end 261 of the pawl 26 comes back into contact with the rotary element 18, in contact with the bottom 332 of the notch 302. The amplitude limiting stop of the rotary element 18 in the uncoupled configuration has in fact placed the initial notch 302 across from the housing 326 and at the end 261 of the pawl 26.

The multi-couplings plate P1 according to the invention allows the following advantages. The locking device 6 with pawl 26 requires only a small amplitude of successive rotations with the key 34, to arrive at the coupled configuration, despite the repellent forces of the valves 2a and 4a. This is perfectly suited for plates with limited access or with high repellent forces, since the force to be supplied can be released after each successive rotation, the rotation of the rotary element 18 in the disconnection direction being prevented by the cooperation of the pawl 26 with one of the stop surfaces 324 delimiting the ratchet notches. The ratchet amplitude of the drive mechanism 16, and therefore the number of intermediate ratchet notches over the maximum movement amplitude of the rotary element 18 between the uncoupled configuration and the coupled configuration, can be adapted depending on the type of application.

The pawl 26 that can be positioned and kept in the maintaining position owing to the pins 264 allows an ergonomic disconnection, since it is not necessary for the operator to keep the pawl 26 in the outer radial maintaining position during the unlocking rotation of the rotary element 18. The use of pins in the form of balls 264 allows improved guiding of the movement of the pawl 26 in the longitudinal grooves 320 and to or from the maintaining notches 322.

The pawl 26 radially movable relative to the rotation axis X18 makes the locking device 6 compact along the axis X18.

The pawl 26 movable parallel to the connecting direction Z makes it possible to arrange the access to the head 270 of the pawl 26 in the same zone as the handle 1 for the placement of the first plate P1 on the second plate P2, which is recommended in case of limited access to the plates P1 and P2.

The difference between the maximum depth of the notches 301 to 308 and the depth of the final notch 309 of the rotary element 18 allows visual marking of the position of the pawl 26 in the coupled position of the plates P1 and P2.

Figure 9:
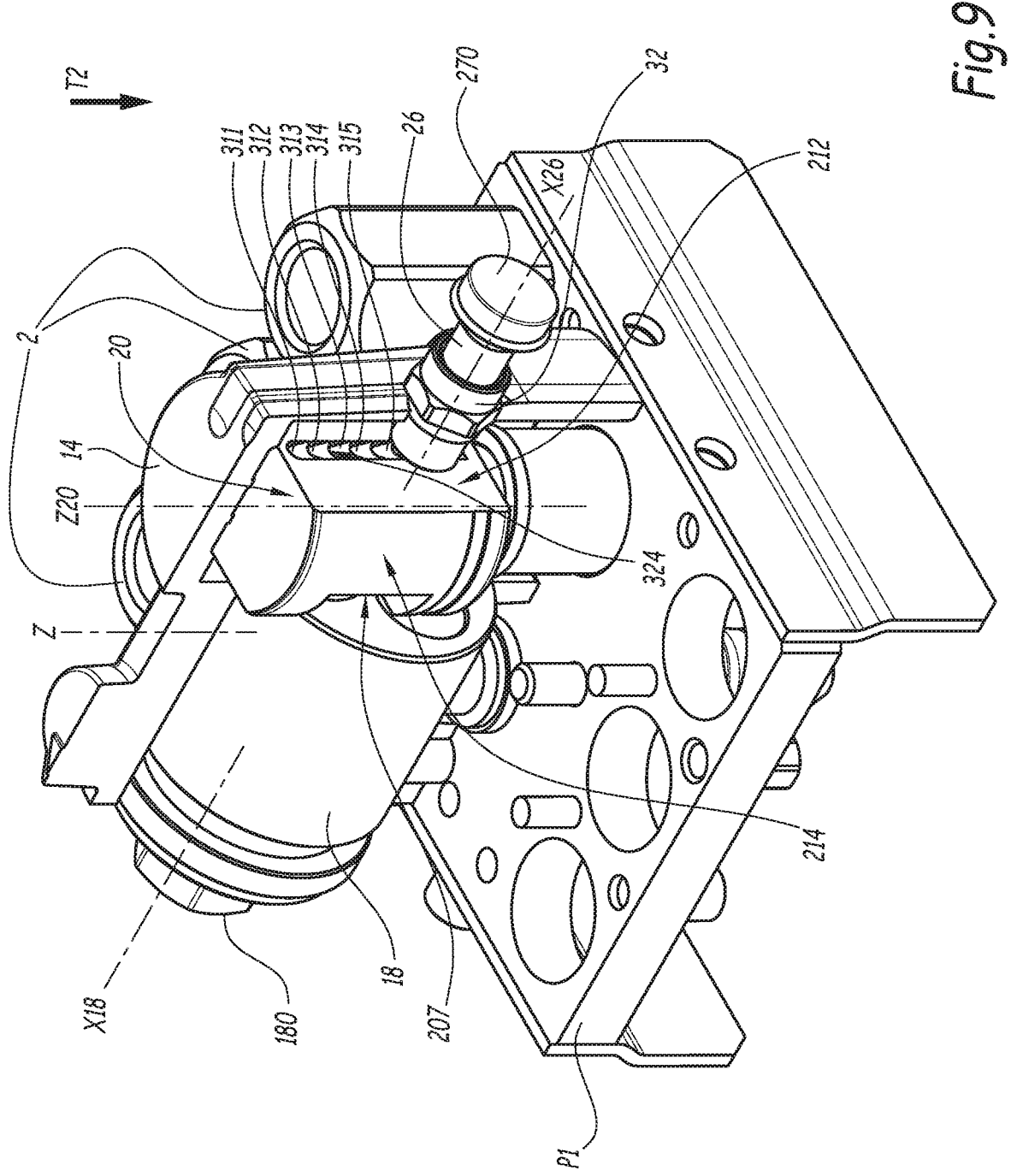
FIG. 9 is a partially sectioned perspective view of a multi-couplings plate according to a second embodiment of the invention in an intermediate coupling configuration.
Figure 10:
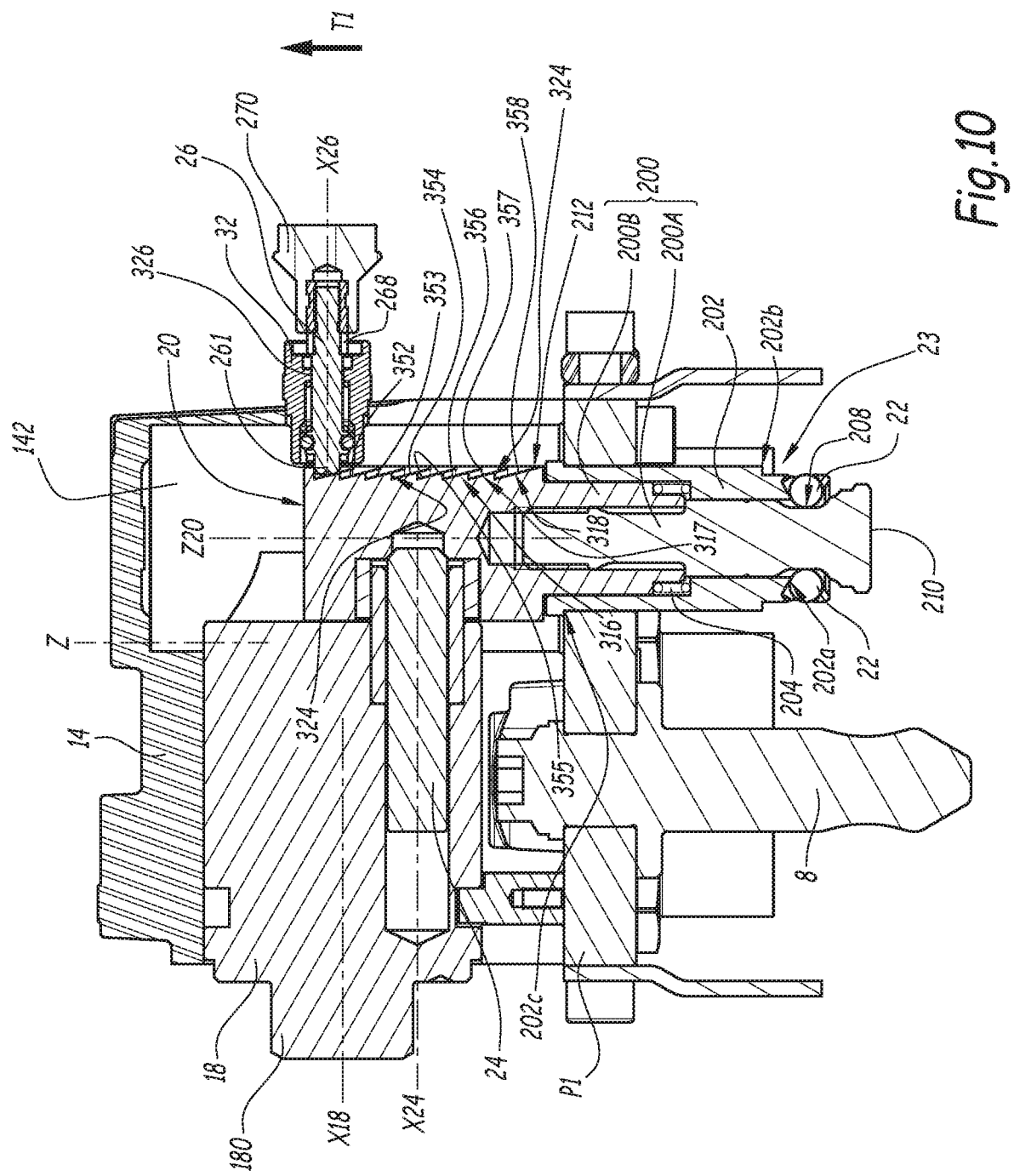
FIG. 10 is a sectional view of the multi-couplings plate of FIG. 9 along the partial section plane of FIG. 9 in the uncoupled configuration.

A second embodiment of the invention is shown in FIGS. 9 and 10. In this embodiment, the elements shared with the first embodiment bear the same references and operate in the same way. Only the differences with respect to the first embodiment are outlined below. FIG. 9 illustrates three connector elements 2 intended to be connected to three complementary connector elements, not shown, and borne by the second plate to form the connectors.

In the embodiment of FIGS. 9 and 10, the locking device 6 comprises ratchet notches 311 to 318 formed not on the outer surface of the rotary element 18, but on another element of the drive mechanism 16 formed by the sliding element 20. The ratchet notches 311 to 318 are formed in a hollow on an outer surface 212 of the lock shaft 200, specifically of the rear part 200B, which is flat, positioned on the side opposite the rotary element 18 relative to the axis Z20 and perpendicular to the plane formed by the axis Z20 and the axis X18. The ratchet notches 311 to 318 are then juxtaposed rectilinearly along the sliding axis Z20 of the lock shaft 200, which is parallel to the connecting direction Z. The ratchet notches 311 to 318 are therefore secured to the translational movement of the lock shaft 200. In the uncoupled configuration of the plate P1, the end 261 of the pawl 26 is engaged in the initial notch 311 and the lock shaft 200 is in the forward position relative to the frame 14, as illustrated by FIG. 10. In the coupled configuration of the plate P1, the end 261 of the pawl 26 is engaged in the final notch 318 and the lock shaft 200 is in the withdrawn position relative to the frame 14. Between the uncoupled configuration and the coupled configuration of the plate P1, the rotary element 18 has undergone a rotation that has caused the movement of the lock shaft 200 along arrow T1 of FIG. 10.

The translational movement of the sliding element 20 in the frame is guided by a cylindrical housing 142 that cooperates with two cylinder portion-shaped side surfaces 214 of the lock shaft 200.

In this case, the pawl 26 slides in a housing 326 of the frame 14 along a sliding axis X26 parallel to the rotation axis X18 of the rotary element 18, but is secured to the frame 14 along the sliding axis Z20. The sliding axis X26 is transverse, in particular orthogonal, to the movement direction of the element 20 of the drive mechanism 16 with which the ratchet notches 311-318 are secured. The same cooperation device between a surface of the frame 14 and the pawl 26 along the axis X26 to keep the pawl 26 in the maintaining position freed from the ratchet notches 311 to 318 upon disconnection is provided. Each ratchet notch 311 to 317 provided on the lock shaft 200 extends over a length, along the axis Z20, corresponding to the travel done by the lock shaft 200 relative to the frame 14 during a rotation of the rotary element 18 around the axis X18 over an amplitude corresponding to the ratchet amplitude of the drive mechanism 16, or a rotation of about 30° by the rotary element 18, or more generally, to a movement amplitude of the key 34 corresponding to a 30° rotation or to a rotation between 20° and 40° by the rotary element 18. The rotation of the rotary element 18 over an amplitude corresponding to a ratchet amplitude allows the pawl 26 to reach the following ratchet notch 312-317 up to the final notch 318.

Like in the first embodiment, each intermediate 312-317 and final 318 ratchet notch is delimited by a respective bottom 352 to 357 and 358 and a stop surface 324 protruding relative to the bottom 352-358 of the ratchet notch in question. Each stop surface 324 extends perpendicular to the axis Z20 and is oriented away from the movement direction of arrow T1. When the pawl 26 cooperates with the stop surface 324, the pawl 26 forms an obstacle to the lock shaft 200 in a movement in the disconnection direction oriented toward arrow T2 of FIG. 9, opposite arrow T1, and blocks the movement of the lock shaft 200 toward its forward position and therefore the rotation of the rotary element 18 in the disconnection direction.

In the intermediate configuration, when the pawl 26 is engaged in an intermediate notch 312-317, the pawl 26 limits the movement of the sliding element 20 in the frame 14 to an intermediate position between its forward position and its withdrawn position.

In the coupled configuration, when the pawl 26 is engaged in the final notch 318, the pawl 26 limits the movement of the sliding element 20 toward its forward position and keeps the lock shaft 200 in its withdrawn position. In other words, the pawl 26 keeps the sliding element 20 in a position relative to the frame 14 compatible with the coupling of the connectors and the flow of fluid between the connector elements 2 and the complementary connector elements.

In a manner not shown, in the same way as in the first embodiment, the depth of the final notch 318, considered parallel to the axis X26 and relative to the outer surface 212, can be greater than the depth of the initial and intermediate notches 311 to 317 in order to allow hiding of the visual marker 268 borne by the pawl 26 in the coupled and locked configuration.

Regarding embodiments that are not shown:
  the pawl 26 may have a radial sliding axis relative to the rotation axis X18 of the rotary element 18, but not parallel to the connecting direction Z. For example, the sliding axis of the pawl 26 may be orthogonal to the axis X18 and the direction Z.
  the pawl 26 may have a sliding axis parallel to the rotation axis X18 of the rotary element 18, and the ratchet notches may be formed on an axial surface of the rotary element 18, i.e., on a surface perpendicular to the rotation axis X18, and not a radial surface, i.e., surrounding the axis X18, as is the case in the first embodiment. The ratchet notches are then juxtaposed along a circumferential direction around the rotation axis of the rotary element 18.
  the locking device does not have an initial ratchet notch, the pawl 26 being in contact with the outer surface 184 or 212 in the uncoupled configuration.
  the rotary element 18 can be equipped on an outer radial surface with ratchet notches juxtaposed in a circumferential direction around the rotation axis of the rotary element 18 and a pawl end mounted in a housing of the frame 14 with a possibility of rotation relative to the frame 14 around an axis parallel to the rotation axis X18 of the rotary element 18 is recalled resiliently in cooperation with one of the ratchet notches. To place the pawl in a maintaining position, it is then necessary to exert a rotation force on the pawl that frees the end of the pawl from the ratchet notches.
  the pin(s) 264 of the pawl 26 protruding from the outer surface of the body 260 can have a shape other than the described spherical geometry, for example cylindrical. Said pin(s) can be in one piece with the body 260. —Pins can be formed protruding from the inner housing 326 of the stopper 32 and cooperate with longitudinal grooves and maintaining notches formed on the outer radial surface of the body 260. When the pins cooperate with the maintaining notches of the body 260, the pawl 26 is kept in the maintaining position; when the pins cooperate with the longitudinal grooves of the body 260, the pawl 26 is pushed resiliently back to engage in one of the ratchet notches.
  the locking device 6 can be equipped with a lock shaft 200 parallel to the rotation axis X18 of the rotary element 18, according to a principle similar to JPH 07 208 673. The elements for converting the rotational movement of the rotary element 18 into a translational movement of the sliding element 20 then comprise a roller and a cam profile.
  the locking device 6 may comprise locking members that are movable relative to the axis Z20 and cooperate with the lock shaft 200 while being housed in a housing passing through the lock shaft 200 and the lock shaft 200 receives, in an inner receiving volume, a lock shaft of the second plate P2 provided with an outer circumferential notch for receiving locking members, according to a principle similar to U.S. Pat. No. 8,864,179.
  the plates P1 and P2 may bear electrical connector elements. The plates P1 and P2 may incorporate electrical connector elements, fluid connectors or combinations or fluid and electrical connectors. Several connector elements borne by the plate P1 are connected to the complementary connector elements by bringing the two plates P1 and P2 closer together.
  the locking members can be different from balls, for example locking fingers, locking segments.
  the engaging profile formed by the hexagonal profile 180 can be formed by a protrusion with another geometry, for example square or triangular, or by a cavity, for example hexagonal, a star with 6 branches, square, triangular, arranged in a hollow in the rotary element and accessible from outside the frame 14.

The features of the embodiments and alternatives described above may be combined to form new embodiments of the invention.

The invention claimed is:

1. A multi-couplings plate for the simultaneous connection of several fluid and/or electrical couplings, the plate having a locking device in a connecting direction for connector elements supported by the plate to complementary connector elements supported by a second plate, the locking device comprising a frame fixed on the plate, locking members and a drive mechanism, the drive mechanism comprising:
  a rotary element mounted rotating in the frame, between an uncoupled configuration and a coupled configuration of the plate,
  a sliding element translatable relative to the frame along the connecting direction and which cooperates with the locking members, the locking members being movable relative to the sliding element between a first unlocked position where they free a passage for the second plate relative to the sliding element, and a second locked position where they are able to secure the sliding element and the second plate in the connecting direction, one or more elements for converting the rotational movement of the rotary element into a translational movement of the sliding element, in the uncoupled configuration, the sliding element is in a forward position relative to the frame and the locking members are able to come into their first unlocked position, in the coupled configuration, the sliding element is in a withdrawn position relative to the frame and the locking members are able to come into their second locked position, wherein the locking device also comprises:

several ratchet notches secured to an element of the drive mechanism and juxtaposed in the movement direction relative to the frame of the element of the drive mechanism, the ratchet notches comprising a final notch and at least one intermediate notch, and a pawl movable in a housing of the frame and pushed back by a spring toward one of the ratchet notches;

and wherein:

when the pawl cooperates with the intermediate notch, the pawl limits the movement of the sliding element toward its forward position to a position midway between the forward position and the withdrawn position, and in the coupled configuration, the pawl cooperates with the final notch and keeps the sliding element in the withdrawn position.

2. The multi-couplings plate according to claim 1, wherein in an engagement configuration in one of the ratchet notches, the pawl is mounted in the frame with the possibility of sliding along a sliding axis, preferably parallel to the connecting direction.

3. The multi-couplings plate according to claim 2, wherein the pawl is able to be pushed back by the spring in cooperation along the sliding axis with a surface of the frame into a maintenance position of the pawl in which the pawl is freed relative to the ratchet notches.

4. The multi-couplings plate according to claim 3, wherein the pawl is equipped with at least one protruding pin, wherein the frame comprises a longitudinal groove oriented along the sliding axis of the pawl and a maintaining notch in which the longitudinal groove emerges circumferentially with respect to the sliding axis, wherein the pin cooperates with the longitudinal groove in the engaged configuration of the pawl in one of the ratchet notches, and wherein the pawl is in a maintaining position when the pin is engaged in the maintaining notch.

5. The multi-couplings plate according to claim 1, wherein the ratchet notches are arranged on the rotary element.

6. The multi-couplings plate according to claim 1, wherein each intermediate and final ratchet notch is delimited by a bottom and a stop surface that protrudes from the bottom and wherein, in an engagement configuration in one of the intermediate and final ratchet notches, the pawl forms an obstacle to the stop surface in a movement direction of the element of the drive mechanism with ratchet notches between the coupled configuration and the uncoupled configuration.

7. The multi-couplings plate according to claim 1, wherein a ratchet amplitude of the drive mechanism corresponds to a 20° to 40° rotation of the rotary element in the frame.

8. The multi-couplings plate according to claim 1, wherein the depth of each intermediate notch is variable.

9. The multi-couplings plate according to claim 1, wherein the depth of the final ratchet notch is greater than the maximum depth of the intermediate ratchet notches.

10. The multi-couplings plate according to claim 9, wherein the pawl has a visual marker, visible on the outside of the locking device except when the pawl cooperates with the bottom of the final ratchet notch.

11. The multi-couplings plate according to claim 1, wherein the locking members are in their second locked position when the pawl is engaged in the first or second intermediate notch.

12. The multi-couplings plate according to claim 1, wherein the rotary element is secured in rotation with an engagement profile for a tool, this engagement profile being accessible from outside the frame.

13. The multi-couplings plate according to claim 1, wherein the elements for converting the rotational movement of the rotary element into a translational movement of the sliding element comprise a control finger, the central longitudinal axis of which is offset from the rotation axis of the rotary element, the control element being connected in rotation around the rotation axis with the rotary element and connected in translation with the sliding element along the connecting direction, the sliding element being guided by a housing of the frame in its translational movement.

14. The multi-couplings plate according to claim 1, wherein the sliding element comprises a lock shaft with a portion having a smaller diameter and a flared end, wherein a locking ring surrounds the lock shaft and houses friction balls forming the locking members, the locking ring being movable relative to the lock shaft between a retracted position in which the friction balls are able to enter their first unlocked position, with the friction balls cooperating with the portion of smaller diameter and being withdrawn from the outer radial surface of the locking ring, and a forward position in which the friction balls are pushed radially back by the flared end into their second locked position, protruding from the outer radial surface of the locking ring, a spring returning the locking ring toward its forward position.

15. An ensemble of plates with the first multi-couplings plate according to claim 1 and the second plate, the second plate bearing a locking element defining a receiving volume capable of receiving the locking members, wherein in the coupled configuration of the first plate with the second plate, the locking members are in their position locked and engaged in the receiving volume of the locking element and the connector elements are coupled to the complementary connector elements.

* * * * *